United States Patent [19]

Ohgaki et al.

[11] Patent Number: 5,138,075

[45] Date of Patent: Aug. 11, 1992

[54] EXTRACTIVE SEPARATION METHOD

[75] Inventors: Kazunari Ohgaki, Nara; Takashi Katayama, Toyonaka, both of Japan

[73] Assignee: Kuraray Co., Ltd., Kurashiki, Japan

[21] Appl. No.: 799,010

[22] Filed: Aug. 27, 1990

Related U.S. Application Data

[63] Continuation of Ser. No. 403,053, Sep. 1, 1989, abandoned, which is a continuation of Ser. No. 217,287, Jul. 11, 1988, abandoned, which is a continuation of Ser. No. 45,530, May 4, 1987, abandoned, which is a continuation of Ser. No. 770,194, Aug. 28, 1985, abandoned, which is a continuation of Ser. No. 627,828, Jul. 5, 1984, abandoned.

[30] Foreign Application Priority Data

Jul. 5, 1983 [JP] Japan .................................. 58-122549
Mar. 16, 1984 [JP] Japan .................................. 59-51884

[51] Int. Cl.$^5$ ............................................ C07D 311/72
[52] U.S. Cl. ..................................... 549/413; 585/800;
210/634; 210/741; 210/742; 210/773; 210/774;
210/808; 554/175; 554/205; 554/184; 554/189;
554/190; 554/210
[58] Field of Search ................... 549/413; 260/412.8;
585/800; 210/634, 741, 742, 773, 774, 808

[56] References Cited

U.S. PATENT DOCUMENTS

| | | | |
|---|---|---|---|
| 3,344,151 | 9/1967 | Nelan | 549/408 |
| 3,879,569 | 4/1975 | Vitzthum et al. | 426/427 |
| 4,124,528 | 11/1978 | Modell | 252/411 R |
| 4,147,624 | 4/1979 | Modell | 210/32 |
| 4,260,639 | 4/1981 | Zosel | 426/478 |
| 4,559,179 | 12/1985 | Hisamoto et al. | 526/292.3 |
| 4,578,445 | 3/1986 | Sakagami et al. | 526/292.3 |

FOREIGN PATENT DOCUMENTS

| | | |
|---|---|---|
| 10636 | 5/1980 | European Pat. Off. |
| 634128 | 3/1950 | United Kingdom |
| 1446638 | 8/1976 | United Kingdom |
| 2059787 | 4/1981 | United Kingdom |
| 2090836 | 7/1982 | United Kingdom |
| 2091292 | 7/1982 | United Kingdom |
| 2110678 | 6/1983 | United Kingdom |
| 2117381 | 10/1983 | United Kingdom |

*Primary Examiner*—Nicky Chan
*Attorney, Agent, or Firm*—Burns, Doane, Swecker & Mathis

[57] ABSTRACT

The present invention provides an extractive separation method in which a solute contained in a medium can be efficiently extracted and separated with a lower consumption of energy under the remarkably gentle operating conditions. This method consists in that a medium containing a solute consisting of organic substances is brought into contact with a solvent consisting of organic substances or inorganic substances, which have the critical temperature of 5° to 152° C. and are gaseous at an atmospheric temperature and an atmospheric pressure, to extract the solute from the medium and then the solute is separated from a mixture of extracts, said solute and said solvent being selected from a group consisting of the combinations forming a mixture system having an additional gas-liquid coexistence region, the extraction being carried out by bringing said medium into contact with said solvent in the sub-critical phase of said solvent, and the subsequent separation being carried out by heating said mixture of extracts to temperatures higher than the critical temperature of said solvent and higher the contact temperature by 5° to 30° C. This method is suitably applicable in particular to the separation of tocopherol from tocopherol-containing vegetable fats and oils with carbon dioxide as the solvent.

9 Claims, 3 Drawing Sheets

EXTRACTIVE SEPARATION METHOD

This application is a continuation of application Ser. No. 403,053, filed Sep. 1, 1989, now abandoned, which is a continuation of application Ser. No. 217,287, filed Jul. 11, 1988, now abandoned, which is a continuation of application Ser. No. 045,530, filed May 4, 1987, now abandoned, which is a continuation of application Ser. No. 770,194, filed Aug. 28, 1985, now abandoned, which is a continuation of application Ser. No. 627,828, filed Jul. 5, 1984, now abandoned.

BACKGROUND OF THE INVENTION

1. Field of the Invention

The present invention relates to an extractive separation method for separating an extract (a solute) in the supercritical phase thereof wherein the extraction is carried out by means of a solvent in the sub-critical phase thereof.

2. Description of the Prior Art

Recently, the supercritical-fluid extraction is being watched with interest as the separation technique of components in the fields of food chemistry, petrochemical industry and the like. This technique consists in that organic or inorganic substances, which are gaseous at the atmospheric temperature and an atmospheric pressure, are pressurized at temperatures over the critical temperature thereof to increase the density thereof and the extraction is carried out by utilizing the dissolving power thereof improved owing to an increase in the density thereof. They say that this technique is advantageous in respect of energy since it does not require the separation means, which is accompanied with the changes in phase of substances such as cooling and distillation, for the separation of a solute from a solvent differently from the usual liquid-liquid extraction. Industrially, the practical applications of this technique can be found in the extractive separation of various kinds of hydrocarbon and the extraction of ethanol from an aqueous solution of ethanol [Japanese Patent Application Laid-Open No. 56201/1981 (BP 2,059,787, DE-OS 3,033,729), Japanese Patent Application Laid-Open No. 92,674/1983 (BP 2,110,678, DE-OS 3,242,420)], the extraction of perfumes from fruit juice [Japanese Patent Application Laid-Open No. 145,195/1982 (BP 2,091,292, DE-OS 3,101,025), Japanese Patent Application Laid-Open No. 74,797/1983 (DE-OS 3,137,230, EP 75,134)], the extraction of caffeine from coffee [Japanese Patent Publication No. 36,344/1976, (DE-AS 2,005,293), Japanese Patent Publication No. 37,334/1976 (U.S. Pat. No. 3,879,569, BP 1,372,667, DE-AS 2,212,281), Japanese Patent Application Laid-Open No. 69,584/1980 (EP 10,636), the extraction of nicotine from tobacco [Japanese Patent Publication No. 9,838/1976 (DE-AS 2,043,537), Japanese Patent Application Laid-Open No. 107,165/1983 (BP 2,111,371, DE-OS 3,148,335, EP 81,231)], the extraction of essence from hop [Japanese Patent Application Laid-Open No. 45,391/1980 (BP 2,026,539, DE-OS 2,827,002, 2,829,308), Japanese Patent Application Laid-Open No. 89,176/1983 (EP 80,582), the regeneration of adsorbents [Japanese Patent Application Laid-Open No. 31,679/1976, Japanese Patent Application Laid-Open No. 61,484/1976 (U.S. Pat. No. 4,124,528, BP 1,522,352, DE-OS 2,544,116), Japanese Patent Application Laid-Open No. 126,678/1977 (DE-OS 2,716,798)] and the like.

However, these known supercritical-fluid extraction methods consist in the repetition of the operation that a medium is brought into contact with a solvent under a superhigh pressure of for example 5 to 6 times the critical pressure to extract the desired solute contained in the medium and then the solute is separated from the solvent by remarkably reducing the pressure and/or temperature to reduce the dissolving power of the solvent.

In the case where the temperature and pressure in the extraction are so severe, there is the danger that the aimed solute is deteriorated whereby being incapable of obtaining the satisfactory result. In addition, an expensive equipment is required for carrying out these methods since the extraction is largely different from the separation in the conditions. Further, there is room for the improvement in their separation efficiency.

SUMMARY OF THE INVENTION

It is an object of the present invention to provide an extractive separation method for efficiently extracting solutes contained in a medium under the remarkably gentle conditions with a still lower energy consumption in comparison with the conventional supercritical-fluid extraction method.

Such an object can be achieved by a method wherein a medium containing solutes consisting of organic substances is brought into contact with a solvent having the critical temperature of 5° to 152° C. and consisting of organic or inorganic substances, which are gaseous at an atmospheric temperature and pressure, to extract the solutes from the medium and then the solutes are separated from the mixture of extracts, characterized by that said solutes and solvent are selected from the combinations forming the mixture systems having an additional gas-liquid coexistence region, the extraction being carried out by bringing said medium into contact with said solvent in the sub-critical phase of said solvent, and the subsequent separation being carried out with heating said mixture of extracts to temperature higher than the critical temperature of said solvent by 5° to 30° C.

DETAILED DESCRIPTION OF THE INVENTION

Figure 1:
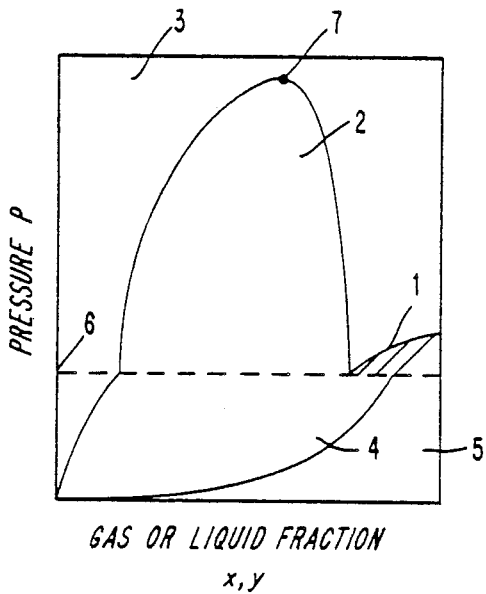
FIG. 1 is a binary system phase equilibrium diagram of solute-solvent at the sub-critical temperature of $T_1$.
Figure 2:
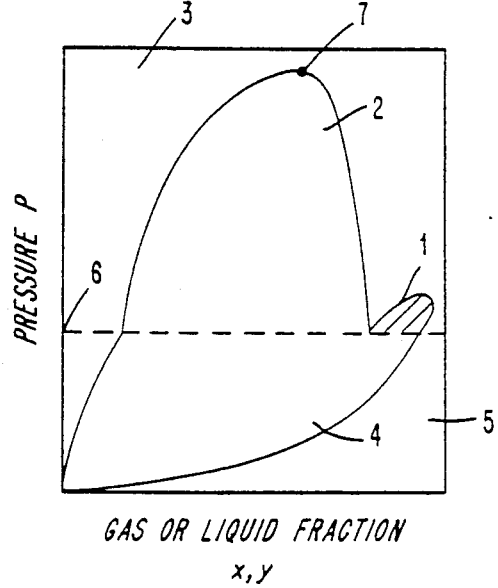
FIG. 2 is a phase equilibrium diagram at temperatures of $T_2$ higher than the critical temperature $T_c$ and lower than the temperature $T_a$ at which an additional gas-liquid coexistence region disappears.
Figure 3:
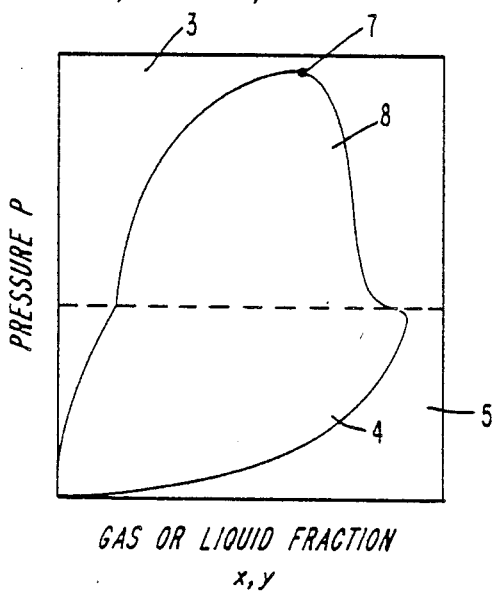
FIG. 3 is a phase equilibrium diagram at the temperature $T_a$.
Figure 4:
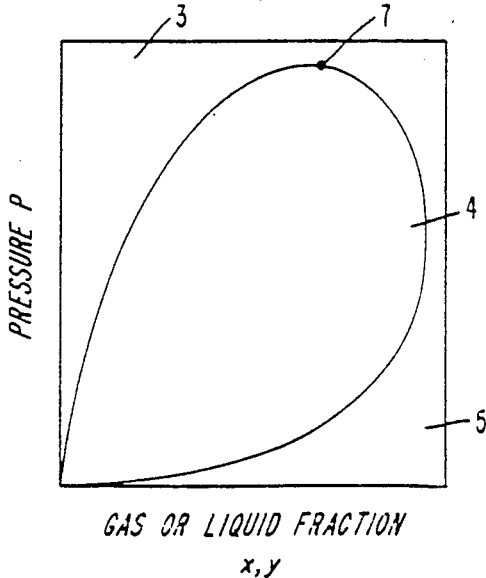
FIG. 4 is a phase equilibrium diagram at temperatures $T_3$ still higher than the temperature $T_a$.

In an extractive separation method according to the present invention, it is required that the solutes and a solvent used for the extraction thereof are combined so as to form the mixture system having an additional gas-liquid coexistence region. Said additional gas-liquid coexistence region is a gas-liquid coexistence region at pressures higher than a gas-liquid-liquid three-phase coexistence pressure if the system is binary as indicated by an oblique lined portion in a solute-solvent binary system phase equilibrium diagram at the sub-critical temperature $T_1$ shown in FIG. 1. 2 designates a liquid-liquid phase, 3 designating a liquid phase, 4 designating a gas-liquid phase, and 5 designating a gas phase. In addition, 6 designates the gas-liquid-liquid three phase coexistence pressure and 7 designates the critical point. This additional gas-liquid coexistence region changes with the rise of temperature to disappear when the temperature rises above a temperature $T_\alpha$ higher than the critical temperature $T_c$ of the solvent by about 10° C. FIG. 2 is a solute-solvent binary system phase equilibrium diagram at temperatures $T_2$ higher than the temperature $T_c$ and lower than the temperature $T_\alpha$ and FIG. 3 is a solute-solvent binary system phase equilibrium diagram at the temperature $T_\alpha$. 8 designates a fluid-fluid phase. Such an additional gas-liquid coexistence region disappears at the temperature $T_\alpha$. FIG. 4 is a solute-solvent binary system phase equilibrium diagram at temperatures $T_3$ still higher than the temperature $T_\alpha$. The conventional supercritical-fluid extraction method consists in that the extraction is carried out under the conditions shown in FIG. 4, for example, at superhigh pressures of 5 to 6 times the critical pressure and then the pressure and/or the temperature is remarkably reduced to extract the solutes from the solvent.

Figure 5:
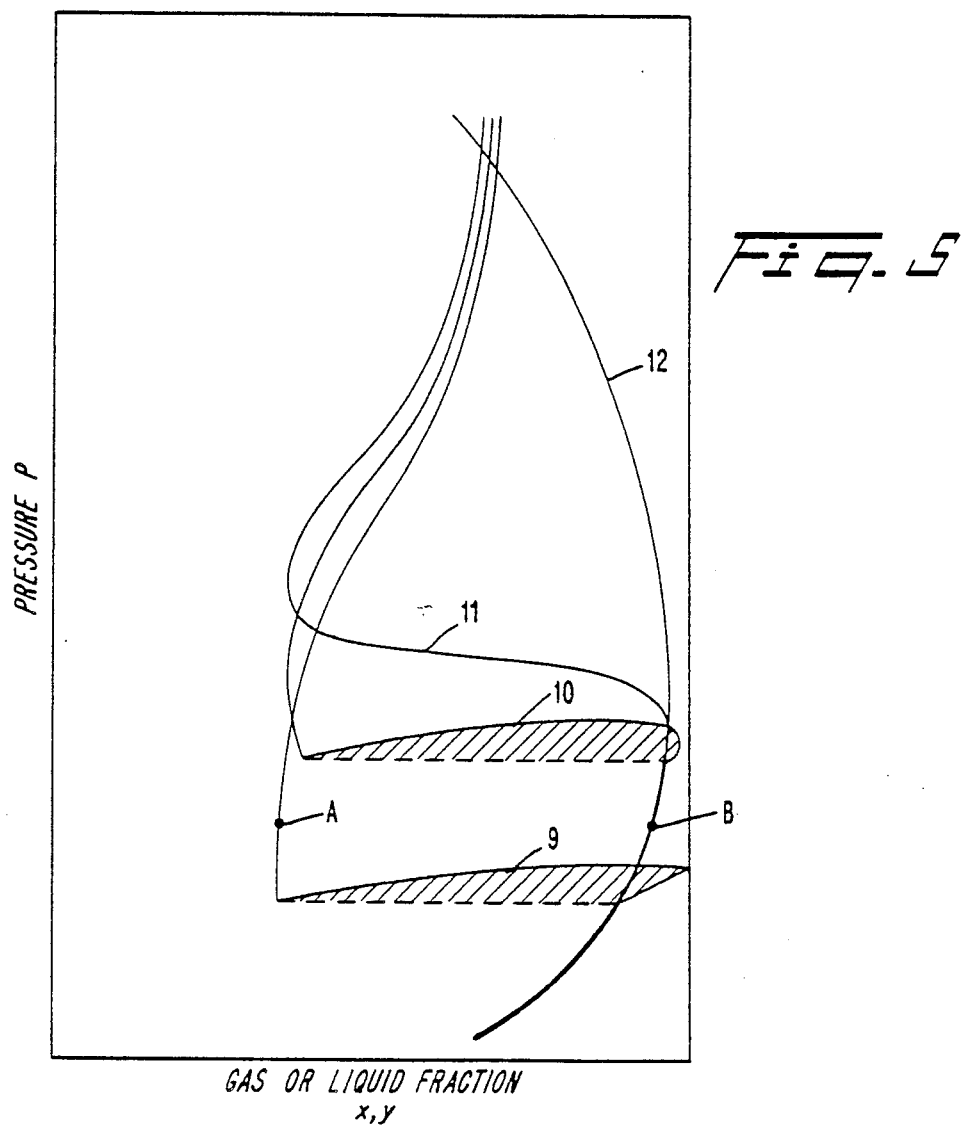
FIG. 5 is an enlarged diagram showing additional gas-liquid coexistence regions shown in FIGS. 1 to 4.

FIG. 5 is an enlarged diagram showing additional gas-liquid coexistence regions shown in FIGS. 1 to 4. 9 designates an additional gas-liquid coexistence region at the sub-critical temperature $T_1$, 10 designating an additional gas-liquid coexistence region at the temperature $T_2$, 11 designating an enlarged gas-liquid equilibrium diagram at the temperature $T_\alpha$, and 12 designating an enlarged gas-liquid equilibrium diagram at the temperature $T_3$. In addition, A designates a point on an equilibrium curve at the temperature $T_1$ and B designates a point on an equilibrium curve at the temperature $T_\alpha$.

An extractive separation method according to the present invention utilizes the radical change in a phase equilibrium within such an additional gas-liquid coexistence region. This will be easily understood from the explanation that it is necessary only to heat the mixture of extracts having the composition corresponding to the point A on the equilibrium curve at the temperature $T_1$ in FIG. 5 to the temperature $T_\alpha$ higher than the temperature $T_1$ by 5° to 30° C. in order to separate the solutes of an amount excepting that corresponding to the equilibrium composition B at said temperature $T_\alpha$. It is obvious that in cases where the solutes and the solvent form the mixture system having such an additional gas-liquid coexistence region, according to the method of the present invention wherein a medium is brought into contact with a solvent in the sub-critical phase of said solvent, in which the solute-dissolving power of said solvent is comparatively high, to extract the desired solutes contained in said medium and then the resulting mixture of extracts is heated to temperatures higher than the critical temperature by 5° to 30° C. with holding the pressure constant to separate the solutes from the solvent, the solutes can be extracted and separated from the solvent under the remarkably gentle operation conditions in the lower energy consumption.

Whether the solutes to be extracted and the solvent to be used form the mixture system having an additional gas-liquid coexistence region or not can be judged by knowing where the critical lines of a solute-solvent binary system are discontinuous or not. That is to say, it is found that the critical lines are discontinuous and an additional gas-liquid coexistence region exists between two components of said solutes and said solvent whereby being capable of carrying out an extractive separation method of the present invention if the lines drawn from the solvent side cross a liquid-liquid coexistence plane or a solid-liquid coexistence plane to terminate halfway whereby disagreeing with the lines drawn from the solute side when the critical lines of a solute-solvent binary system are drawn in accordance with a Heidemann's method [AIChE Journal., 26 (5), 769–779 (1980)].

The critical lines can be determined by solving the equation of state of a solute-solvent binary system and the limit of stability about the phase diffusion. It is known that the state in mixtures is accurately described by the following Soave-Redlich-Kwong's equation:

$$P = \frac{RT}{v - b} - \frac{a}{v(v + b)} \tag{1}$$

wherein P designates pressure, R designating gas constant, T designating temperature, and v designating molar volume. a and b, which are constants proper to each component, are calculated from the following equations:

$$a = \sum_j \sum_i x_i x_j a_{ij} \tag{2}$$

$$b = \sum_i x_i b_i \tag{3}$$

The constant $a_{ii}$, $a_{jj}$ and $b_i$ for each pure component are determined by the following equations:

$$a_{ii} = \frac{0.4275 R^2 Tc_{ii}^2}{Pc_{ii}} [1 + m(1 - Tr_{ii})^{0.5}]^2$$

$$a_{jj} = \frac{0.4275 R^2 Tc_{jj}^2}{Pc_{jj}} [1 + m(1 - Tr_{jj})^{0.5}]^2$$

$$b_i = \frac{0.0866 R Tc_i}{Pc_i}$$

$$m = 0.480 + 1.574\omega - 0.176\omega^2$$

wherein Tc designates critical temperature, Pc designating critical pressure, Tr designating reduced temperature, $\omega$ designating acentric factor (Pitzer), and i and j designating the i-th and the j-th component, respectively.

The values of Tc, Pc and $\omega$ are proper to substances and detailedly described in R. C. Reid, J. M. Prausnitz and T. K. Sherwood, "The properties of Gases and Liquids, Appendix A Property Data Bank" (1977) Mc Graw-Hill Book Co. However, when not described in the above described, they can be estimated from the molecular structure in accordance with the method described in A. L. Lydersen, "Estimation of Critical Properties of Organic Compounds" (1955). Although the constant a for the mixture can be determined from the constants $a_{ii}$, $a_{jj}$ and $b_i$ by $a = (1 - k_{ij})\sqrt{a_{ii} a_{jj}}$, the value of the interaction parameter $k_{ij}$ is required. $k_{ij}$ can be determined if there is a phase equilibrium data at an optional point. Even though there are no phase equilibrium data, it can be estimated from, for example, the values of thermodynamic properties such as the data of heat of mixing since they are expressed by the function of $k_{ij}$ and this function can be easily solved. If a and b in the equation (1) can be determined by the equations (2), (3), the fugacity coefficient can be calculated by the following equation (4):

$$\ln\phi i = \frac{1}{RT} \int_V^\infty \left[ \left( \frac{P}{\partial ni} \right)_{T,V,nj} - \frac{RT}{V} \right] dV - \ln Z \quad (4)$$

wherein $\phi i$ designates fugacity coefficient, V designating volume, and Z designating compressibility factor. In addition, there is the relation expressed by the following equation (5) between fugacity fi and fugacity coefficient $\phi i$:

$$fi = \phi i \, xi \, P \quad (5)$$

where xi designates a molar fraction of the i-th component. On the other hand, since Helmholz free energy F is expressed by the equation $\partial F/\partial ni = RT\ln fi$, F can be written in the form of the following equation (6) by the use of fugacity:

$$\frac{\partial^2 F}{\partial nj \partial ni} = RT \frac{\partial \ln fi}{\partial nj} \quad (=qij) \quad (6)$$

The point slightly shifted from the point of temperature $T^o$ and volume $V^o$ must be satisfied with the following equation (7) so that the point of temperature $T^o$ and volume $V^o$ may be stable:

$$[F - F^o - \Sigma_i \mu_i^o \Delta ni]_{T^o, V^o} > 0 \quad (7)$$

wherein $\mu$ designates chemical potential, $\Delta n$ designating a change in molar number, a suffix i designating the i-th component, and 0 designating test point.

The equation (7) is subjected to Taylor's development to obtain the following equation (8):

$$\left[ F - F^o - \sum_i \mu_i^o \Delta ni \right]_{T,V} = \frac{1}{2} \sum_j \sum_i \left( \frac{\partial^2 F}{\partial nj \partial ni} \right)_{T,V} \Delta ni \Delta nj + \quad (8)$$

$$\frac{1}{2} \cdot \frac{1}{3} \sum_k \sum_j \sum_i \left( \frac{\partial^3 F}{\partial nk \partial nj \partial ni} \right)_{T,V} \Delta ni \Delta nj \Delta nk + \ldots > 0$$

Since the critical point of mixtures exists on the boundary of the stable single phase, the first term of the right side in the equation (8) must be 0. Accordingly, in a binary system it is required that the following equation (9) and the following equation (10) are simultaneously satisfied:

$$\begin{pmatrix} q_{11} & q_{12} \\ q_{21} & q_{22} \end{pmatrix} \begin{pmatrix} \Delta n_1 \\ \Delta n_2 \end{pmatrix} = 0 \quad (9)$$

$$\begin{vmatrix} q_{11} & q_{12} \\ q_{21} & q_{22} \end{vmatrix} = 0 \quad (10)$$

In addition, also the second term of the right side in the equation (8) must be 0 owing to a high-order limit of stability on the boundary. That is to say, the following equation (11) is established:

$$\sum_k \sum_j \sum_i \left( \frac{\partial^3 F}{\partial nk \partial nj \partial ni} \right)_{T,V} \Delta ni \Delta nj \Delta nk = 0 \quad (11)$$

Since qij is a function of fugacity (accordingly, a function of temperature T and volume V) as described above, the critical temperature $T_c$ and the critical volume $V_c$ can be determined by solving the equations (9) to (11). $P_c$ can be determined from $T_c$ and $V_c$ by the equation (1).

Figure 6:
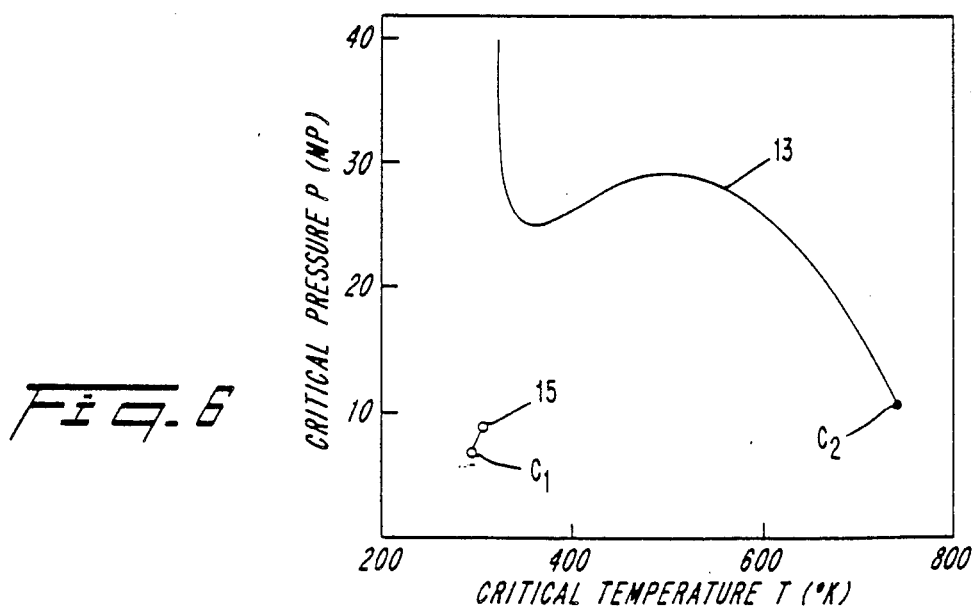
FIG. 6 is a diagram showing critical lines for octadecane-$CO_2$ system.
Figure 7:
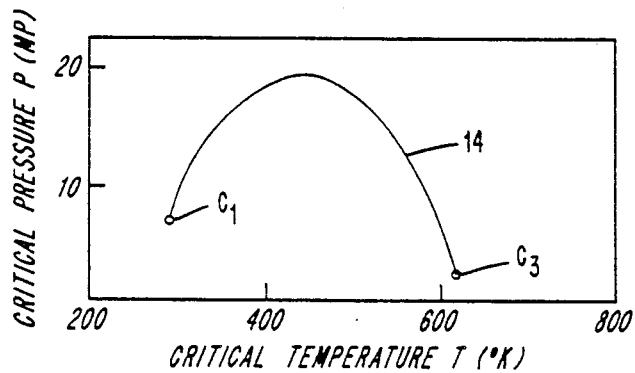
FIG. 7 is a diagram showing critical lines for decane-$CO_2$ system.

The critical lines for an octadecane-$CO_2$ system and those for a decane-$CO_2$ system drawn by the above described method are shown in FIG. 6 and FIG. 7, respectively. 13 designates the critical lines for an octadecane-$CO_2$ system, 14 designating the critical lines for a decane-$CO_2$ system, and 15 designating an end point. In addition, $C_1$ designates the critical point for $CO_2$, $C_2$ designating the critical point for octadecane, and $C_3$ designating the critical point for decane. An octadecane-$CO_2$ system is one example, to which an extractive separation method according to the present invention can be applied, since the critical lines for an octadecane-$CO_2$ system are discontinuous and an octadecane-$CO_2$ system forms a mixture system having an additional gas-liquid coexistence region. On the contrary, a decane-$CO_2$ system is one example, to which an extractive separation method according to the present invention can not be applied, since the critical lines for a decane-$CO_2$ system are continuous and a decane-$CO_2$ system does not form a mixture system having an additional gas-liquid coexistence region. Also in cases where the solute and/or the solvent consist of two or more components, the components of the solute can be extracted and separated by a method of the present invention if the critical lines for every combination of the component of the solute and the component of the solvent are discontinuous. Other components of the solute also can be extracted and separated if the critical lines for them are discontinuous. It can be found by drawing the critical lines in such a manner that a plurality of solutes can be simultaneously extracted or a single solute can be selectively extracted.

In cases where the medium contains two or kinds of solute forming the above described additional gas-liquid coexistence region when contacted with the solvent, since the mixture of such solutes is separated from the solvent by a method of the present invention in general, the mixture of solutes can be separated into components thereof by applying again a method of the present invention with using other solvents forming a mixture system having an additional gas-liquid coexistence region merely for the specified solute or using the usual means such as distillation.

Every organic substance forming an additional gas-liquid coexistence region with a solvent can be selected as a solute which can be extracted and separated by a method of the present invention. It includes hydrocarbons such as octadecane, decane, eicosane, naphthalene, decalin, tetralin, pinene, pine oil and biphenyl; hydrocarbon halogenides such as 2-ethyl hexyl chloride, dichlorobenzene, trichlorobenzene, bromobenzene, dibromobenzene and chlorotoluene; alcohols such as n- hexanol, n-octanol, 2-ethyl hexanol, nonanol, n-decanol, undecanol, n-dodecanol, benzyl alcohol, ethylene glycol, propylene glycol and glycerine; ethers such as n-hexyl ether, methyl phenyl ether, ethyl phenyl ether and ethyl benzyl ether; ketones and aldehydes such as acetonyl-acetone, phorone, acetophenone, dypnone, benzaldehyde and salicylaldehyde; esters such as benzyl acetate, dioctyl sebacate, dimethyl phthalate, diethyl phthalate, dibutyl phthalate, 2-ethyl hexyl phthalate, dioctyl phthalate, monoglyceride, diglyceride and triglyceride; aliphatic acids and phenols such as oleic acid, caproic acid, caprylic acid, 2-ethylhexoic acid, lactic acid, benzoic acid, phenol, cresol and xylenol; nitrogen compounds such as nitrobenzene, aniline, benzonitrile and quinoline; tocols such as $\alpha$-tocopherol and $\beta$-tocopherol; or the mixtures thereof.

In addition, every liquid or solid organic or inorganic substance, which is insoluble to a solvent or does not form a mixture system having an additional gas-liquid coexistence region with the solvent used under the extracting conditions, can be used as a medium containing solutes therein. It includes various kinds of hydrocarbon, alcohols, polystyrene, copolymers of polystyrene and divinylbenzene, polymeric adsorbents such as active carbon and alumina and inorganic adsorbents. A medium containing solutes therein includes vegetables and wild grasses such as mugwort, dill, parsley, celery, fennel, pepper and ginger; seeds and cereals such as cacao, vanilla, nuts, cotton and juniper; foodstuffs such as hop, yeast, milk and yolk of an egg; tocopherol-containing vegetable fats and oils; and the like. Every fat and oil extracted from vegetable seeds, fruits, leaves, roots and the like containing tocopherol can be used as said tocopherol-containing vegetable fats and oils. It includes palm oil, coconut oil, cotton-seed oil, germ oil, linseed oil, peanut oil, rape seed oil, rice-bran oil, sesame oil, soy bean oil, safflower oil, carrot oil, corn oil or the mixtures thereof.

The solvent used in the present invention is an organic or inorganic substance with the critical temperature of 5° to 152° C., preferably 15° to 120° C. It is suitably selected from the group consisting of carbon dioxide ($CO_2$), carbon subsulfide, hydrogen bromide, hydrogen chloride, hydrogen sulfide, nitrous oxide, phosphine, radon, ethane, propane, propylene, acetylene, freon and the like or the mixtures thereof with taking the combination with a solute to be extracted thereof into consideration. It is undesirable to use organic or inorganic substances, which have the critical temperature lower than 5° C. or higher than 152° C. and are gaseous at an atmospheric temperature, for the solvent since the operating temperature is severe.

A method of the present invention can be in particular advantageously applied to the extraction and separation of tocopherol from tocopherol-containing vegetable fats and oils by the use of the solvent substantially consisting of carbon dioxide. Thus tocopherol can be obtained under gentle operating conditions with a lower energy consumption, high efficiency and high selectivity. The residual vegetable fats and oils after the separation of tocopherol, for example, palm-nut oil can be used as various kinds of industrial material. In general, crude vegetable fats and oils contain components having uncomfortable odor. Accordingly, it is inevitable to refine them by the deodorizing process. On the contrary, according to a separation method of the present invention, odorless fats and oils can be obtained. In addition to the effective separation of tocopherol, it is one of the remarkable advantages of the present invention that the residual fats and oils without requiring the additional deodorizing process can be obtained.

A solvent, which substantially consists of carbon dioxide, in the present invention is generally one consisting of carbon dioxide only. It includes, however, also carbon dioxide, to which organic or inorganic substances having the critical temperature of 5° to 152° C. and being gaseous at an atmospheric temperature and an atmospheric pressure are added, so far as the characteristic of forming a mixture system having an additional gas-liquid coexistence region for tocopherol is essentially held.

According to the present invention, the extraction is carried out by bringing a medium containing solutes into contact with a solvent in the subcritical phase of said solvent and the subsequent separation is carried out by heating the mixture of extracts to temperatures of the critical temperature of said solvent or more and higher than the contact temperature by 5° to 30° C., preferably 7° to 20° C. Although it is required that the contact temperature is lower than the critical temperature of the solvent, an advantageousness in respect of energy is reduced when the difference between temperatures in the extracting process and those in the separating process is too large while an extracting efficiency is reduced when the difference between temperatures in the extracting process and those in the separating process is too small. Taking these into consideration, it is practically desired that the extracting temperature is lower than the critical temperature of the solvent by 5° to 20° C., preferably 5° to 10° C.

Although it is a matter of course that the pressure used in the present invention must be selected so that the solubility of the solute to the solvent at the extracting temperature determined in dependence upon the kind of the solvent used may be larger than the solubility of the solute to the solvent at the separating temperature determined in dependence upon the kind of the solvent used alike to said extracting temperature, it is preferable to select the pressure so that the difference between said solubilities may be maximum. Accordingly, it is suitable to select the solvent from the group consisting of substances by means of which the extraction and separation can be carried out at lower temperatures and pressures.

Figure 8:
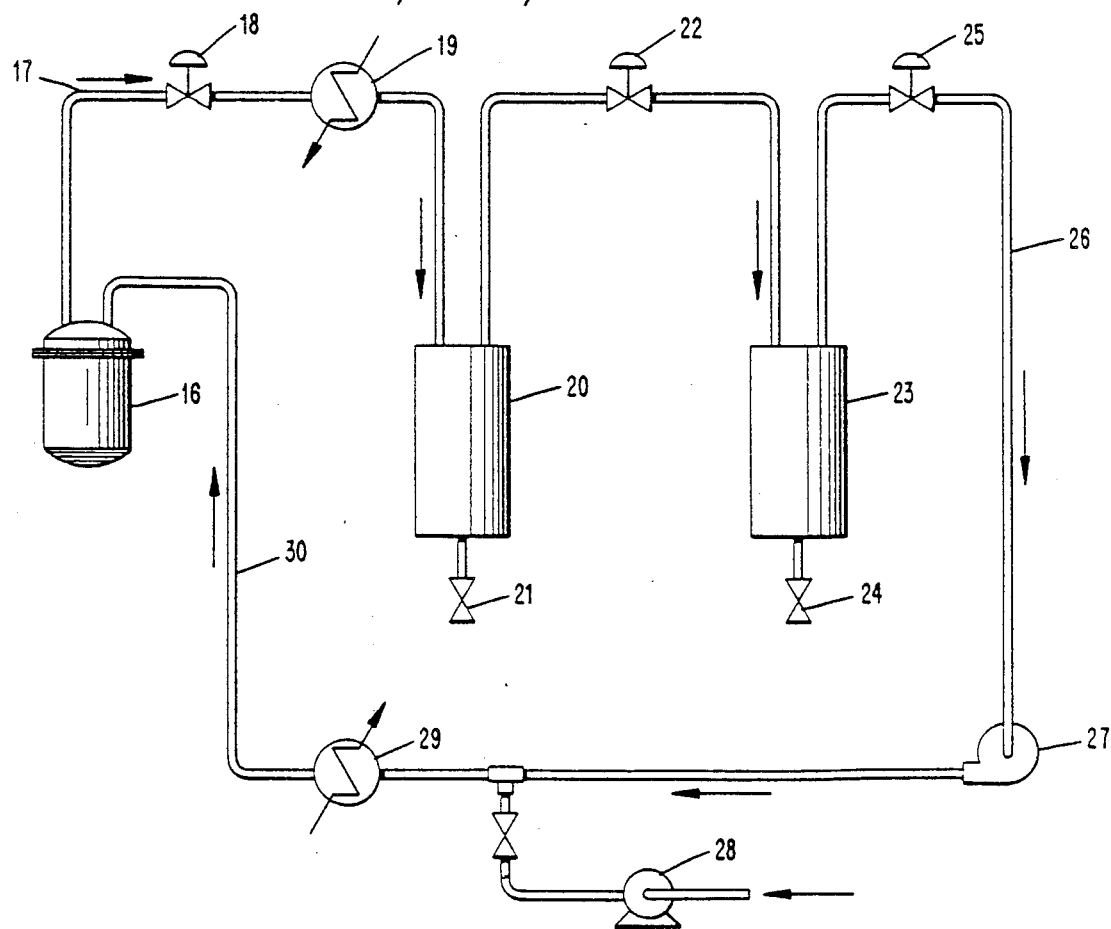
FIG. 8 is a flow chart showing an example of an extractive separation method according to the present invention.

When tocopherol is extracted with carbon dioxide as a solvent from tocopherol-containing vegetable fats and oils in the present invention, in general, not only tocopherol but also free acids and triglycerides as impurities, which are contained in said fats and oils, are extracted. In the subsequent separating process, the extracts mainly comprising tocopherol containing triglycerides are separated from the solvent containing a remarkably large amount of free acid. Since it is undesirable to recycle the solvent containing free acids for the extraction, said solvent is held at pressures lower than the pressure, at which tocopherol is separated from the solvent, by 0.1 to 5 MPa, preferably 1 to 4 MPa, to separate free acids therefrom whereby recovering the solvent in the form suitable to the recirculation. When this difference in pressure is smaller than 0.1 MPa, the solvent is insufficiently separated from free acids and unseparated free acids are circulated in the system together with carbon dioxide whereby reducing the isolating efficiency of tocopherol. On the other hand, even though the above described difference in pressure is increased over 5 MPa, there is no hope of a proportional increase in separation efficiency for the separation of free acids from the solvent whereby leading to the consumption of a large quantity of energy in the re-elevation of pressure for circulatingly using carbon dioxide alone. The separation of tocopherol by means of carbon dioxide is in more detail described with reference to FIG. 8 showing one example of a method of the present invention. Tocopherol-containing vegetable fats and oils are fed into an extractor 16. The initial feed of carbon dioxide as a solvent into said extractor 16 is carried out by means of a pump 28. Although every vessel, which is pressure resistant and corrosion resistant, can be used as said extractor 16, an autoclave and a packed tank are usually used. The temperature of a heater 19 and a cooler 29 is set to the appointed one. Tocopherol-containing vegetable fats and oils and the solvent are circulated in the system by operating a compressor 27. The pressure of said extractor 16 is adjusted by a pressure-regulating valve 18. The mixture of extracts passes through a piping 17 and is heated in said heater 19. The heated mixture consisting of carbon dioxide, tocopherol and free acids is introduced into the first separator 20. Said first separator 20 is held under the same pressure as said extractor 16 by means of a valve 22. Said mixture is separated into the fraction comprising tocopherol as the main component and carbon dioxide containing free acids. A separator of every type, in which tocopherol can be separated from said mixture of extracts, can be used as said first separator 20. The usual mist separator, packed tank and the like are used. The extracts containing tocopherol as the main component are discharged through an extracting valve 21 and the mixture consisting of free acids, which hardly contain tocopherol, and carbon dioxide is introduced into the second separator 23. Although a separator of every type can be as said second separator 23, ones of the same type as said first separator 22 are usually used. Said second separator 23 is operated under the pressure lower than that of said first separator 22 by 0.1 to 5 MPa. Free acids are separated from carbon dioxide in said second separator 23. The pressure in the system is regulated by a pressure-regulating valve 25. Free acids are discharged out of the system through an extracting valve 24. Carbon dioxide passes through a piping 26, being compressed again by means of a compressor, being regulated in temperature in said cooler, and then being fed again into said extractor 16. Carbon dioxide lost in the operation is supplemented by means of said pump 28. The mixture of tocopherol and triglycerides obtained in said first separator 20 can be separated into tocopherol and triglycerides by the usual separating means such as distillation.

As understood from the above described, although an extractive separation method of the present invention is positioned between the conventional supercritical-fluid extraction and an extraction with liquefied high-pressure gases, according to a method of the present invention, an extractive separation can be carried out under the gentler operating conditions than those in the conventional supercritical-fluid extraction and an extraction with liquefied high-pressure gases. Accordingly, a method of the present invention is an extractive separation method effective in cases where a solvent is circulatingly used. A method of the present invention is particularly effective in cases, where a medium is tocopherol-containing vegetable fats and oils and carbon dioxide is used as a solvent, since not only tocopherol can be efficiently and very selectively extracted and separated but also odorless fats and oils can be obtained.

A method of the present invention is concretely described below with reference to the preferred embodiments but not limited at all by those.

EXAMPLE 1

An octadecane (solute)-$CO_2$ (solvent) system shows discontinuous critical lines as shown in FIG. 6, said two components forming a mixture system having an additional gas-liquid coexistence region. In addition, $CO_2$ can dissolve a maximum amount of octadecane therein at 25° C. and 8.0 to 10 MPa.

50% by weight-solution of octadecane in triglyceride of 40 g fed into an autoclave having an internal volume of 150 ml were subjected to the extraction with $CO_2$ at the sub-critical temperature of 25° C. $CO_2$ was fed into said autoclave held at a pressure of 8.5 MPa and a temperature of 25° C. at a rate of 8.0 g/min to extract octadecane and then said extracts were heated in a heater to 40° C. with holding the pressure constant to separate octadecane from $CO_2$ in a separator. Only the first separator was used as separators. After regulating in temperature again, $CO_2$ was circulatingly used. After operating about 1 hour under such conditions, octadecane of 8.15 g could be obtained.

EXAMPLE 2

An oleic acid (solute)-$CO_2$ (solvent) system shows discontinuous critical lines similarly to the solute-solvent system of EXAMPLE 1. In addition, $CO_2$ can dissolve a maximum amount of oleic acid therein at 25° C. and 8.0 to 10 MPa.

25% by weight-solution of oleic acid in triglyceride of 40 g fed into an autoclave having an internal volume of 150 ml were subjected to the extraction with $CO_2$ at the sub-critical temperature of 25° C. $CO_2$ was fed into said autoclave held at a pressure of 9.0 MPa and a temperature of 25° C. at a rate of 8.0 g/min to extract oleic acid and then said extracts were heated to 40° C. in a heater with holding the pressure constant to separate oleic acid from $CO_2$ in a separator. Only the first separator was used as separators. $CO_2$ was regulated in temperature again to circulatingly use. After operating about 4 hours under these conditions, oleic acid of 5.0 g could be obtained.

COMPARATIVE EXAMPLE 1

A decane (solute)-$CO_2$ (solvent) system shows continuous critical lines as shown in FIG. 7, said two components not forming a mixture system having an additional gas-liquid coexistence region. 50% by weight-solution of decane in triglyceride of 40 g fed into an autoclave as used in EXAMPLES 1, 2 were treated for 8 hours under the same conditions as in EXAMPLE 1 but decane could not be obtained at all.

EXAMPLE 3

Palm-nut oil, which contained α-tocopherol at a ratio of 0.10% by weight and free acids at a ratio of 0.06% by weight, of 100 g fed into an autoclave having an internal volume of 150 ml was subjected to the extraction with carbon dioxide at the sub-critical temperature of 25° C. $CO_2$ was fed into said autoclave held at a pressure of 10 MPa and a temperature of 25° C. at a rate of 0.6 g/min to extract α-tocopherol. Then said mixture of extracts was heated to 40° C. in a heater with holding the pressure constant and it was separated into a component containing α-tocopherol as the main ingredient and carbon dioxide containing free acids in the first separator. Carbon dioxide containing free acids was separated into free acids and carbon dioxide in the second separator held at a pressure of 6.0 MPa and a temperature of 25° C. Carbon dioxide was regulated in temperature again to circulatingly use. After operating about 1.5 hours under these conditions, a mixture of 126.4 mg consisting of α-tocopherol of 84.7 mg and triglyceride of 41.7 mg was obtained from the first separator and a mixture of 63.2 mg containing free acids of 57.5 mg was obtained from the second separator.

It is obvious that tocopherol can be very selectively extracted and separated according to the present invention. In addition, although crude palm-nut oil showed an offensive odor, it did not show an offensive odor after treating by a method of the present invention.

EXAMPLE 4

Coconut oil, which contained α-tocopherol at a ratio of 0.11% by weight and free acids at a ratio of 0.07% by weight, of 100 g fed into an autoclave having an internal volume of 150 ml was subjected to the extraction with carbon dioxide at the subcritical temperature of 30° C. Carbon dioxide was fed into said autoclave held at a pressure of 10 MPa and a temperature of 30° C. at a rate of 0.6 g/min to extract α-tocopherol. Then said mixture of extracts was heated to 40° C. in a heater with holding the temperature constant to separate into a component containing α-tocopherol as the main ingredient and carbon dioxide containing free acids in the first separator. Carbon dioxide containing free acids was separated into free acids and carbon dioxide in the second separator held at a pressure of 7.0 MPa and a temperature of 30° C. Carbon dioxide was regulated in temperature again to circulatingly use. After operating about 1.5 hours under these conditions, a mixture of 124.9 mg consisting of α-tocopherol of 83.6 mg and triglyceride of 41.3 mg was obtained from the first separator and a mixture of 62.5 mg containing free acids of 56.3 mg was obtained from the second separator.

It is obvious that tocopherol can be very selectively extracted and separated according to the present invention. In addition, although crude coconut oil showed an offensive odor, it did not show an offensive odor after treating by a method of the present invention.

COMPARATIVE EXAMPLE 2

Palm-nut oil, which contained α-tocopherol at a ratio of 0.10% by weight and free acids at a ratio of 0.06% by weight, of 100 g fed into an autoclave having an internal volume of 150 ml was subjected to the extraction with carbon dioxide at 40° C. Carbon dioxide was fed into said autoclave held at a pressure of 15 MPa and a temperature of 40° C. at a rate of 0.6 g/min to extract α-tocopherol. Then the pressure of said mixture of extracts was reduced to 10 MPa with holding the temperature constant to separate said mixture of extracts into a component containing α-tocopherol as the main ingredient and carbon dioxide containing free acids in the first separator. Carbon dioxide containing free acids was separated into free acids and carbon dioxide in the second separator held at a temperature pressure of 9.7 MPa and a temperature of 39° C. Carbon dioxide was regulated in temperature again to circulatingly use. After operating about 2.0 hours under these conditions, α-tocopherol of merely 45 mg was obtained from the first separator. In addition, the separation of free acids in the second separator was incomplete, so unseparated free acids were circulated in the system and the selectivity for α-tocopherol was remarkably low as indicated by a ratio of α-tocopherol to triglyceride by weight of 54:46.

COMPARATIVE EXAMPLE 3

Palm-nut oil, which contained α-tocopherol at a ratio of 0.10% by weight and free acids at a ratio of 0.06% by weight, of 100 g fed into an autoclave having an internal volume of 150 ml was subjected to the extraction with carbon dioxide at 80° C. Carbon dioxide was fed into said autoclave held at a pressure of 35 MPa and a temperature of 80° C. at a rate of 0.6 g/min to extract α-tocopherol. Then the pressure of said mixture of extracts was reduced to 30 MPa with holding the temperature constant to separate said mixture of extracts into the solute and the solvent. After operating about 1.5 hours under these conditions, extracts of 659 mg were obtained. But the composition of said extracts was almost same as the composition of crude palm-nut oil. That is to say, α-tocopherol could not be selectively obtained.

What is claimed is:

1. An extractive separation method comprising:
   (a) contacting a medium that includes a solute with a solvent so as to extract a mixture of extracts, said medium including the solute comprising vegetable fats and oils containing tocopherol, wherein (1) said solute and said solvent are selected from combinations that form a mixture system whose phase equilibrium diagram has an additional gas-liquid coexistence region; (2) said solvent has a critical temperature in the range of from 5° to 152° C. and is gaseous at atmospheric pressure and atmospheric temperature; (3) said mixture of extracts comprises at least said solute; and (4) said medium contacts said solvent in the sub-critical phase of said solvent; and
   (b) separating said solute from said mixture of extracts by heating said mixture to a temperature higher than the critical temperature of said solvent and higher than the contact temperature by 5° to 30° C.

2. An extractive separation method as set forth in claim 1, wherein said solvent is carbon dioxide.

3. An extractive separation method as set forth in claim 1, wherein said solvent is recovered and recirculated to use for the extraction of the solute.

4. An extractive separation method as set forth in claim 2, wherein said sub-critical phase exists at temperatures lower than the critical temperature of carbon dioxide by 5° to 10° C.

5. An extractive separation method as set forth in claim 2, wherein deodorized vegetable fats and oils are recovered in the form of extraction residue, a mixture of extracts being separated into an extract containing tocopherol as the main ingredient and the solvent containing free acids by heating to temperatures higher than the critical temperature of carbon dioxide, and then said solvent fraction is held at pressures lower than the pressure in the above described separation by 0.5 to 5 MPa to further separate said free acids from said solvent fraction, and said solvent is recycled for the extraction.

6. An extractive separation method as set forth in claim 1, wherein said solvent is ethane, propane, or propylene.

7. An extractive separation method as set forth in claim 1, wherein said mixture of extracts is heated to a temperature higher than the critical temperature of said solvent and higher than said contact temperature by 7° to 20° C.

8. An extractive separation process as set forth in claim 1, wherein said contact temperature of said solvent and said medium is lower than the critical temperature of said solvent by 5° to 20° C.

9. An extractive separation method, wherein a medium comprising vegetable fats and oils and a solute comprising tocopherol is brought into contact with a solvent comprising carbon dioxide to extract said solute from said medium, and thereafter said solute is separated from the resulting mixture of extracts, wherein said solute and said solvent form a mixture system having an additional gas-liquid coexistence region in a binary solute-solvent phase equilibrium diagram, the extraction being carried out by heating said mixture of extracts to a temperature higher than the critical temperature of said solvent and higher than the contact temperature by 5° to 30° C.

* * * * *